United States Patent
Cashaw

(12) 
(10) Patent No.: US 7,743,548 B1
(45) Date of Patent: Jun. 29, 2010

(54) FISHING POLE HOLDER

(76) Inventor: Ezell Cashaw, 207 Elizabeth St., Charleston, MS (US) 38921

( * ) Notice: Subject to any disclaimer, the term of this patent is extended or adjusted under 35 U.S.C. 154(b) by 0 days.

(21) Appl. No.: 11/670,531

(22) Filed: Feb. 2, 2007

(51) Int. Cl.
*A01K 97/10* (2006.01)

(52) U.S. Cl. .......................................... 43/21.2; 43/15

(58) Field of Classification Search ................. 43/21.2, 43/15; D22/147; 248/530
See application file for complete search history.

(56) References Cited

U.S. PATENT DOCUMENTS

| | | | |
|---|---|---|---|
| 142,126 A * | 8/1873 | Senieur ....................... 248/530 |
| 3,285,360 A * | 11/1966 | Wetsch ........................... 43/17 |
| 3,360,224 A * | 12/1967 | Baumann, Jr. .............. 248/530 |
| 4,176,819 A * | 12/1979 | Lowe .......................... 248/513 |
| 4,650,146 A * | 3/1987 | Duke ........................... 248/512 |
| D332,821 S * | 1/1993 | Padilla ....................... D22/147 |
| 5,245,778 A | 9/1993 | Gallegos et al. |
| 5,349,775 A * | 9/1994 | Mondares .................... 43/21.2 |
| 5,488,798 A * | 2/1996 | Beachel ....................... 43/21.2 |
| 5,566,495 A * | 10/1996 | Kim et al. .................... 43/21.2 |
| 5,613,318 A | 3/1997 | Hislop |
| 6,050,019 A | 4/2000 | Anderson |
| 6,094,851 A | 8/2000 | Guidry |
| 6,301,820 B1 | 10/2001 | Rosa |
| D461,522 S * | 8/2002 | James et al. ............... D22/147 |

* cited by examiner

*Primary Examiner*—Kurt Rowan
(74) *Attorney, Agent, or Firm*—Crossley Patent Law; Mark A. Crossley

(57) ABSTRACT

A fishing pole holder that includes a base and a pole holding portion, with the pole holding portion designed to be mounted atop the base. The base is designed to be driven into a ground surface. The pole holding portion includes a mounting bar, a pair of connector arms, and a pole holder that is pivotally attached to the pair of connector arms. A spring is attached to both the pole holder and the mounting bar, with the default position of the spring being present when the pole holder is pointed upward. The pole holder can bent downward and connected to the mounting bar with a latch. When a fishing pole placed within the pole holder is jerked by a biting fish, the latch will disconnect from the mounting bar, forcing the pole holder to rapidly move upward through a pulling action by the spring, thereby jerking the fishing pole line and ideally snagging the fish hook in the biting fish's mouth.

5 Claims, 3 Drawing Sheets

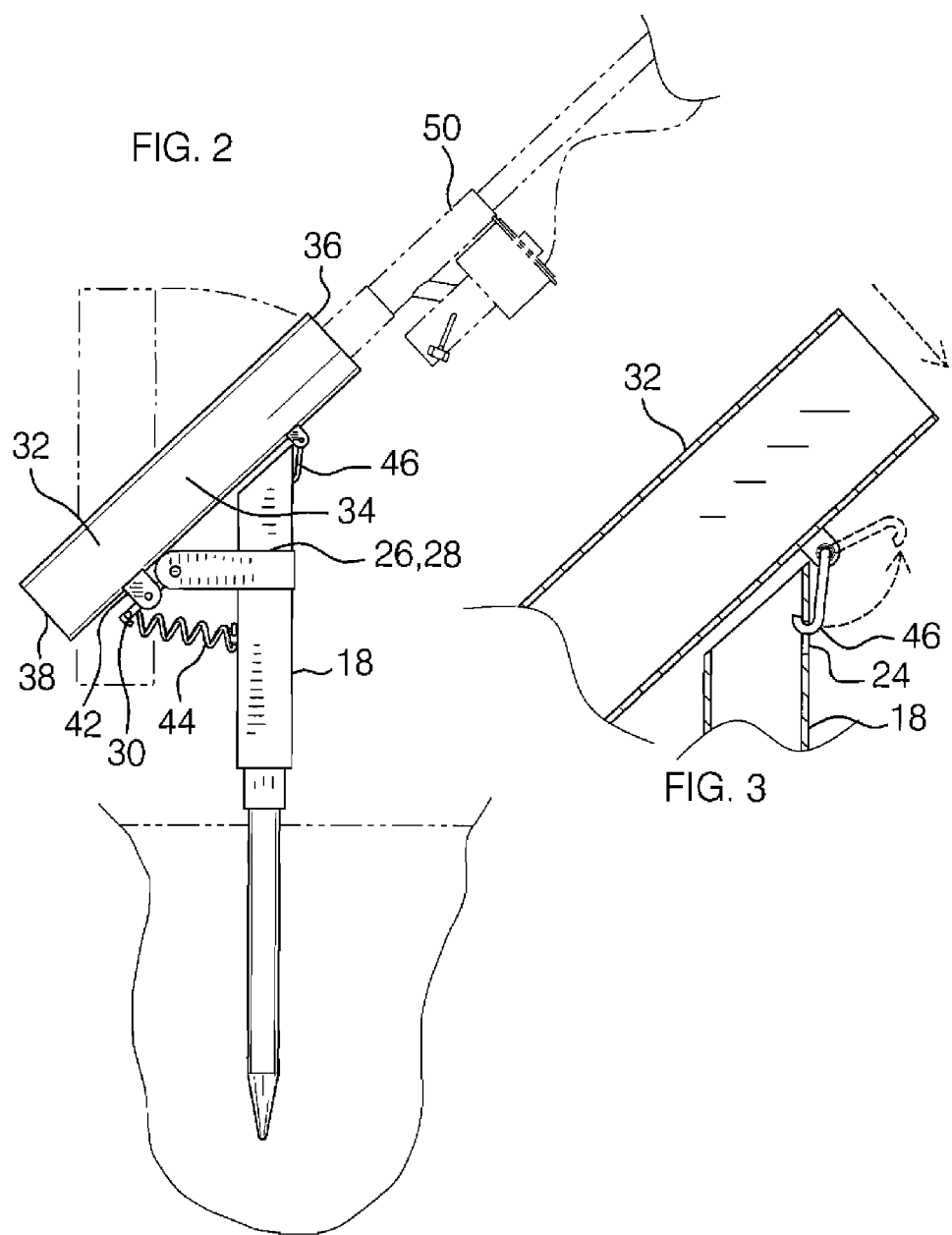

FISHING POLE HOLDER

BACKGROUND OF THE INVENTION

The present invention concerns that of a new and improved fishing pole holder that includes a base and a pole holding portion, with the pole holding portion designed to be mounted atop the base.

DESCRIPTION OF THE PRIOR ART

U.S. Pat. No. 5,613,318, dated Mar. 25, 1997, issued to Hislop, discloses a fishing rod holder that includes a spring loaded fishing rod mount that is attached to a retractable frame by means of a rotating cross member.

U.S. Pat. No. 5,245,778, dated Sep. 21, 1993 issued to Gallegos et al., discloses a fishing rod holder that includes a spring-loaded fishing rod mount that is pivotally attached to the top of a release mechanism housing.

U.S. Pat. No. 6,094,851 A, dated Aug. 1, 2000, issued to Guidry, discloses a pivotally supported, resiliently biased fishing rod holder.

U.S. Pat. No. 6,050,019 A, dated Apr. 18, 2000, issued to Anderson, discloses an invention that holds a fishing rod and reel in a variety of situations and automatically sets the fishing hook when a fish strikes the baited hook or lure.

U.S. Pat. No. 6,301,820 B1, dated Oct. 16, 2001, issued to Rosa, discloses a rod holder rotatably connected to a mounting having an adjustable array of hooks for connecting rubber bands to the rod holder and a latch trigger which releases when a fish pulls the rod holder downward.

SUMMARY OF THE INVENTION

The present invention concerns that of a new and improved fishing pole holder that includes a base and a pole holding portion, with the pole holding portion designed to be mounted atop the base. The base is designed to be driven into a ground surface. The pole holding portion includes a mounting bar, a pair of connector arms, and a pole holder that is pivotally attached to the pair of connector arms. A spring is attached to both the pole holder and the mounting bar, with the default position of the spring being present when the pole holder is pointed upward. The pole holder can bent downward and connected to the mounting bar with a latch. When a fishing pole placed within the pole holder is jerked by a biting fish, the latch will disconnect from the mounting bar, forcing the pole holder to rapidly move upward through a pulling action by the spring, thereby jerking the fishing pole line and ideally snagging the fish hook in the biting fish's mouth.

There here has thus been outlined, rather broadly, the more important features of a fishing pole holder that the detailed description thereof that follows may be better understood and in order that the present contribution to the art may be better appreciated. There are, of course, additional features of the fishing pole holder that will be described hereinafter and which will form the subject matter of the claims appended hereto.

In this respect, before explaining at least one embodiment of the fishing pole holder in detail, it is to be understood that the fishing pole holder is not limited in its application to the details of construction and to the arrangements of the components set forth in the following description or illustrated in the drawings. The fishing pole holder is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present fishing pole holder. It is important, therefore, that the claims be regarded as including such equivalent constructions insofar as they do not depart from the spirit and scope of the present invention.

It is therefore an object of the present invention to provide a fishing pole holder which has all of the advantages of the prior art and none of the disadvantages.

It is another object of the present invention to provide a fishing pole holder which may be easily and efficiently manufactured and marketed.

It is another object of the present invention to provide a fishing pole holder which is of durable and reliable construction.

It is yet another object of the present invention to provide a fishing pole holder which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 2 shows a side view of the base and the pole holding portion of the fishing pole holder after these two parts have been connected to one another and after a fishing pole has been inserted into the pole holding portion.

FIG. 3 shows a close-up side view of the pole holder, highlighting its attachment to the mounting bar of the pole holding portion and showing how the latch can be connected and disconnected from the mounting bar.

DESCRIPTION OF THE PREFERRED EMBODIMENT

Figure 1:
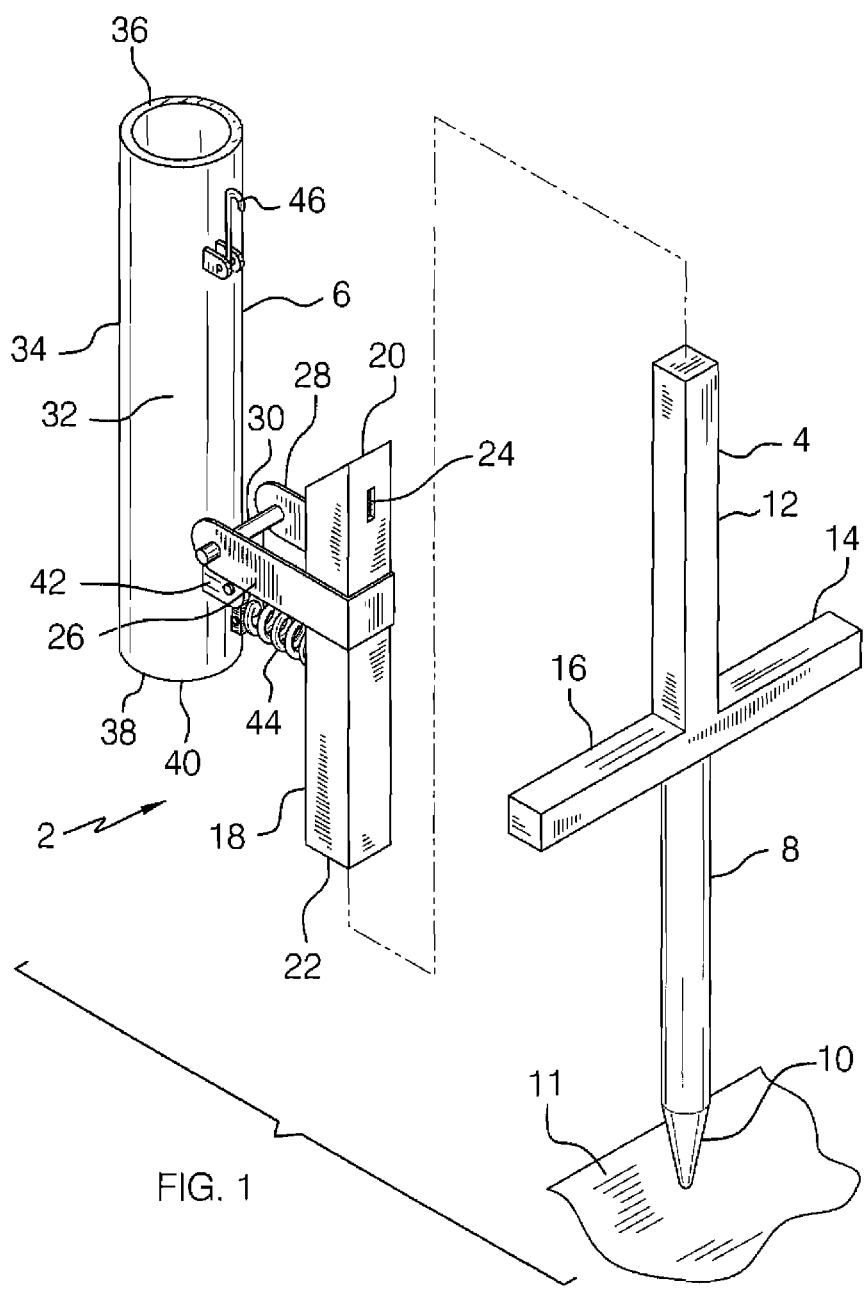
FIG. 1 shows a perspective view of the base and the pole holding portion of the fishing pole holder prior to these two parts being connected to one another.
Figure 4:
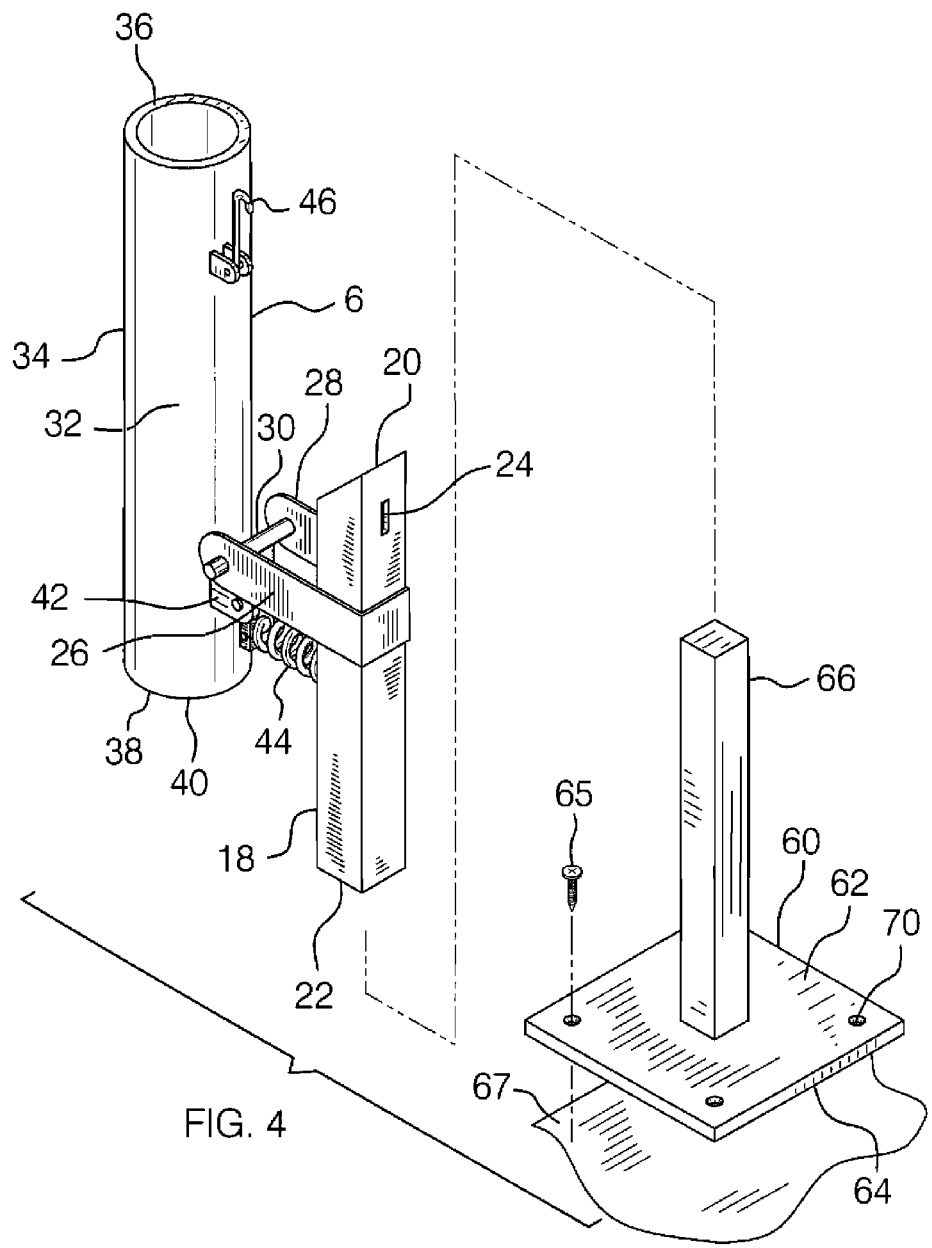
FIG. 4 shows a perspective view of an alternative embodiment and highlights the base and the pole holding portion of the fishing pole holder prior to these two parts being connected to one another, with this embodiment designed to be mounted within a boat.

With reference now to the drawings, and in particular to FIGS. 1 through 4 thereof, a new fishing pole holder embodying the principles and concepts of the present invention and generally designated by the reference numeral 2 will be described.

As best illustrated in FIGS. 1 through 4, the fishing pole holder 2 comprises a base 4 and a pole holding portion 6 that is designed to bemounted on the base. The base 4 itself comprises a stake 8 that has a bottom-mounted pointy end 10 which is designed to be pound into a ground surface to properly mount the fishing pole holder 2.

The base 4 also comprises an upper bar 12 and two side bars comprising a left side bar 14 and a right side bar 16. The upper bar 12, left side bar 14, and right side bar 16 are all connected to the stake 8 at the same place, giving the base 4 a cross-shape or plus-shape.

The upper bar 12, left side bar 14, and right side bar 16 can have a wide variety of cross-sectional shapes. However, it is preferred that these three bars have a square cross-sectional shape.

The pole holding portion 6 comprises a mounting bar 18 that has two ends, a top end 20 and a bottom end 22. The mounting bar 18 is hollow with both ends of the mounting bar 18 being open. The top end 20 of the mounting bar 18 is angled and further includes a latch hole 24.

A pair of connector arms 26 and 28 are attached to the mounting bar 18 and extend away from the mounting bar 18. The connector arms 26 and 28 are attached via a T-connector 30, to which the pole holder 32 is pivotally attached. Pole holder 32 is a cylindrical tube 34 that has two ends, a top end 36 and a bottom end 38, with the bottom end 38 of the cylindrical tube 34 having a flat base 40. The top end 36 of the cylindrical tube 34 is open.

The pole holder 32 further comprises a bottom-mounted extender 42 that is attached to the cylindrical tube near the bottom end 38 of the cylindrical tube 34. The extender 42 is the portion of the pole holder 32 that is attached to the pair of connector arms 26 and 28, allowing it to be pivotally attached.

The pole holding portion 6 further comprises a spring 44 that has two ends, a first end and a second end. The first end of the spring 44 is connected to the pole holder 32, while the second end of the spring 44 is connected to the mounting bar 18. The spring 44 is in the "default" (unstretched) position when the pole holder 32 is pointing straight upward. In order to temporarily fasten the top end of the cylindrical tube 34 is lowered toward the top end of the mounting bar 18. Then, a latch 46, which is attached to the cylindrical tube 34 of the pole holder 32 near the top end 36 of the tube 34, is fastened to the latch hole 24.

Once the pole holder 32 is flush against the mounting bar 18, a fishing pole 50 can be cast and then placed within the cylindrical tube 34 of the pole holder 32. The cylindrical tube 34 will then remain in place until it is given a strong jostle, presumably by a biting fish. Once this occurs, the latch 46 will quickly separate from the latch hole 24, thereby causing the spring 44 to quickly pull the cylindrical tube 34 of the pole holder 32 into an upright position. This quick movement of the cylindrical tube 34, and by default the fishing pole 50, will hopefully snag the hook on the fishing pole in the fish's mouth, thereby making it easier to be able to reel the fish in.

In an alternative embodiment of the present invention, base 4 comprises a flat plate 60 that has two surfaces, a top surface 62 and a bottom surface 64. The bottom surface 64 is meant to be mounted to a flat surface 67 with a plurality of fasteners 65 through a plurality of holes 70 that are located on the flat plate 60. The flat surface 67 can be any type of flat surface, such as the flat surface 67 that is found on a dock or in a boat. A single stand 66 is attached to the top surface 62 of the flat plate 60, with the one using the stand 66 to mount the mounting bar 18 of the pole holding portion 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A fishing pole holder comprising:
   a base mounted to a ground surface,
   a fishing pole holding portion attached to the base,
   wherein the base mounted to a ground surface further comprises a stake, the stake having a bottom-mounted pointy end, wherein the pointy end is inserted into the ground surface,
   wherein the base further comprises an upper bar mounted to the stake,
   wherein the base further comprises a pair of side bars comprising a left side bar and a right side bar, wherein the left side bar and the right side bar are both attached to the stake,
   wherein the base has a cross-like shape,
   wherein the fishing pole holding portion attached to the base further comprises
      a mounting bar having two ends, a top end and a bottom end, the mounting bar being hollow, the bottom end of the mounting bar being open,
      a pole holder fabricated from a cylindrical tube, the cylindrical tube having two ends comprising a top end and a bottom end,
      a base attached to the bottom end of the pole holder,
      means for connecting the pole holder to the mounting bar,
   wherein the bottom end of the mounting bar is placed over the upper bar of the base,
   wherein the top end of the mounting bar is angled,
   wherein the means for connecting the pole holder to the mounting bar further comprises:
      a pair of connector arms comprising a first connector arm and a second connector arm, the pair of connector arms being fixedly attached to the mounting bar,
      an extender attached to the pole holder near the bottom end of the pole holder, and
      a connector that is attached each of the connector arms of the pair of connector arms, further wherein the connector is attached to the extender.

2. A fishing pole holder according to claim 1 wherein the fishing pole holder further comprises means for holding the pole holder in an upward position.

3. A fishing pole holder according to claim 2 wherein the means for holding the pole holder in an upward position further comprises a spring, the spring having two ends comprising a first end and a second end, wherein the first end of the spring is attached to the pole holder, further wherein the second end of the spring is attached to the mounting bar, further wherein the spring is in a default, unstretched position when the pole holder is in an upright position.

4. A fishing pole holder according to claim 3 wherein the fishing pole holder further comprises means for mounting a fishing pole in an angled position.

5. A fishing pole holder according to claim 4 wherein the means for mounting a fishing pole in an angled position further comprises:
   (a) a latch hole attached to the mounting bar near the top end of the mounting bar,
   (b) a latch attached to the pole holder near the top end of the pole holder,
   (c) a fishing pole inserted into the cylindrical tube of the pole holder,
   (d) wherein the pole holder is lowered down until the latch can be attached to the latch hole.

* * * * *